United States Patent [19]
Arff

[11] 4,049,552
[45] Sept. 20, 1977

[54] OZONE GENERATING SYSTEM

[75] Inventor: John H. Arff, Portland, Oreg.

[73] Assignee: Oregon Patent Development Company, Portland, Oreg.

[21] Appl. No.: 632,383

[22] Filed: Nov. 17, 1975

Related U.S. Application Data

[63] Continuation-in-part of Ser. No. 508,400, Sept. 23, 1974, abandoned, which is a continuation-in-part of Ser. No. 343,790, March 22, 1973, abandoned.

[51] Int. Cl.$^2$ ............................................. C02B 1/38
[52] U.S. Cl. ...................................... 210/192; 210/202; 210/257 R; 210/50; 261/DIG. 42; 261/DIG. 75; 21/74 A; 250/540
[58] Field of Search ................ 210/63 Z, 64, 192, 50, 210/194, 195 R, 198 R, 200–202, 252, 254, 257 R, 205; 21/74 A; 261/DIG. 42, DIG. 75; 250/532–541

[56] References Cited

U.S. PATENT DOCUMENTS

| | | | |
|---|---|---|---|
| 2,606,150 | 8/1952 | Thorp | 210/63 Z |
| 3,326,747 | 6/1967 | Ryan et al. | 210/63 Z |
| 3,699,776 | 10/1972 | La Raus | 210/192 |
| 3,730,874 | 5/1973 | Trub | 250/540 |
| 3,761,065 | 9/1973 | Rich et al. | 261/DIG. 42 |
| 3,766,051 | 10/1973 | Bollyky | 250/540 |

FOREIGN PATENT DOCUMENTS

| | | | |
|---|---|---|---|
| 572,766 | 3/1933 | Germany | 210/192 |

Primary Examiner—Thomas G. Wyse
Assistant Examiner—Benoit Castel
Attorney, Agent, or Firm—Eugene M. Eckelman

[57] ABSTRACT

A housing has an interior casing receiving a coolant. This casing is associated with a forced cooling system and has open ended tubular portions therethrough formed of electrically conducting metal. Glass ozone generating tubes are removably supported in the tubular portions by axial movement and are held in spaced ozone generating position by spacers on the tubes. The tubes have an electrically conducting silver coating on the interior surface and have an interior band engageable with the coating for admitting high voltage to the tube from a conductor leading into the tube. A treatment tank associated with the ozone generating system has a recirculating conduit operably connected with the housing for the ozone generating tubes. An additional conduit extends from the treatment tank to a storage tank and a filter for filtering out coagulated material is provided in this conduit.

5 Claims, 8 Drawing Figures

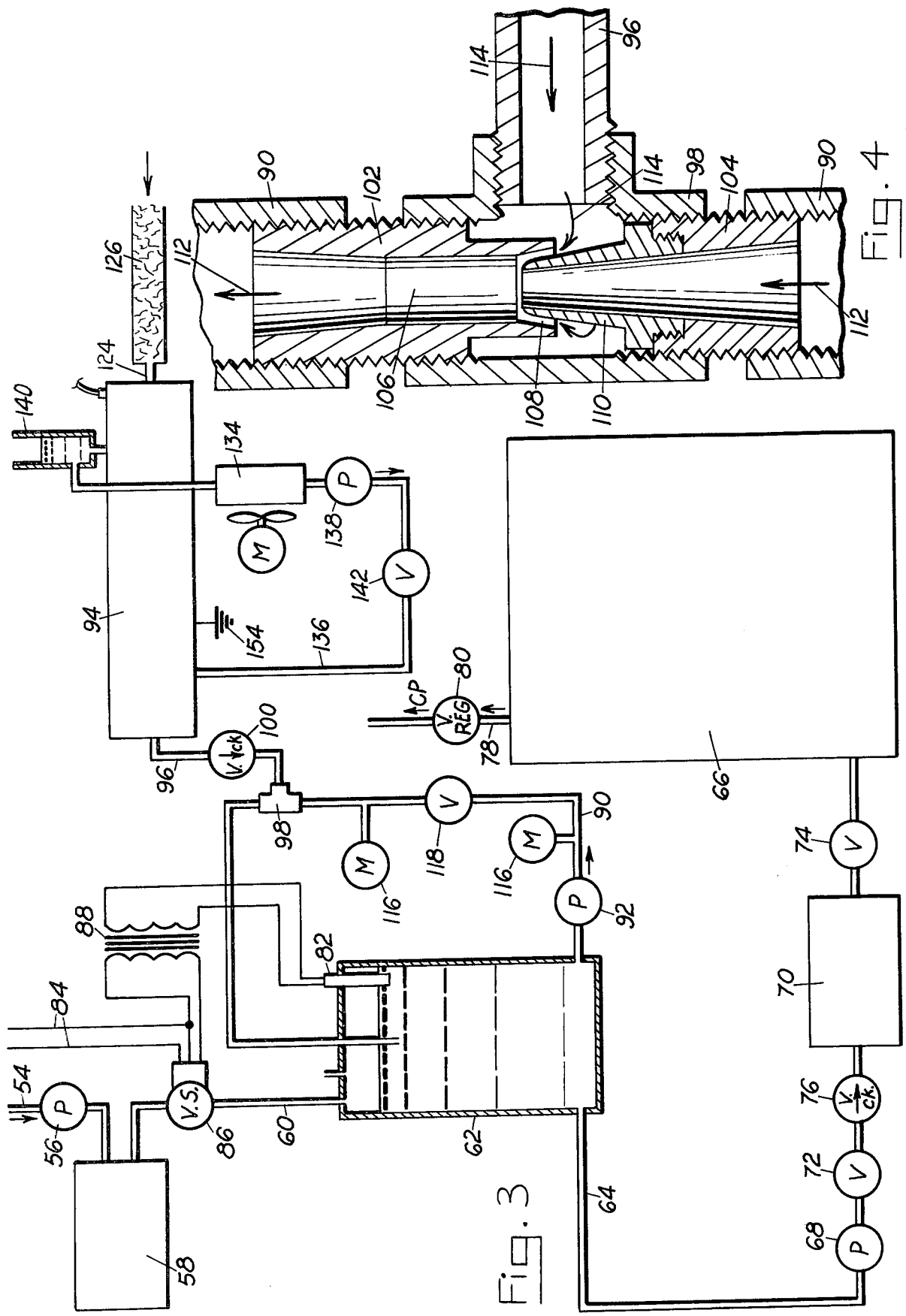

OZONE GENERATING SYSTEM

This is a continuation-in-part of application Ser. No. 508,400, filed Sept. 23, 1974, which is a continuation-in-part of application Ser. No. 343,790 filed Mar. 22, 1973 for Process of Forming Filterable Precipitate In Metal Solutions, And Apparatus both now abandoned.

This invention relates to an ozone treating system.

It is often desirable to treat water to remove impurities such as for making distilled water. Ozone has heretofore been employed since it is well known that ozone destroys virus and bacteria. Ozone, however, has not met with wide usage since it is difficult to safely subject water thereto or to provide the necessary and practical detention time to destroy the virus and bacteria. It is also desirable at times to treat water for the purpose of removing metal precipitates from solution, for reasons hereinafter set forth, but in many cases the precipitates are too small to be picked up by filters which are economically feasible to use. Accordingly, it is a primary objective of the invention to provide an apparatus of treating water having a broad range of usage so as to be useful for many purposes.

One example of use of the instant invention is in association with making distilled water and another example is in association with electroplating processes wherein it is used to purify rinse solutions thereof. In both cases, it has been found that the desired purification can be obtained by treatment with ozone by the present apparatus. Also, in connection with electroplating, rinse water therefrom after being treated with the present apparatus can be discharged into conventional waterways or sewers. Such has not heretofore been possible under existing regulations, since such rinse material if discharged in a waterway causes contamination and if discharged in a sewer destroys the necessary bacteria. It has not been possible heretofore to economically filter out the impurities in the rinse solution for re-using the solution because the impurities, which comprise leftover portions of metal in solution, are too small to be picked up by a common and inexpensive filter.

As a part of the invention, it has been found that to treat an electroplating rinse solution with ozone allows the rinse solution to be filtered economically, namely, by means of a sand filter of 5 to 7 micron size, to remove impurities which comprise mostly metal in solution. Without such treatment the impurities cannot be removed without complex filtering apparatus, reverse filtering, or other means which are not economically feasible. The rinse water from the electroplating process after being treated by the instant invention can be used over and over. The theory of operation is as follows:

The dissolved or negative oxygen which exists in water makeup has a negative polarity, attracting the positive ions of metal, such as copper ions, into the plating solutions and locking them in suspension where they stay until an electric potential is applied. Such potential and current drives the metal ions out of suspension and onto the work or cathode. The thickness of the layer deposited on the work depends on the strength of the electric current and on the duration of the bath and the number of plating applications.

As stated above, the electric potential separates the metal from the solution. This forms positive ions or cations and negative ions or anions, and it is these ions that accomplish the coating. As an example, in a soluble copper salt solution, a precipitate characteristic of a copper sulphate solution upon electrolysis is $$Cu^{++} \rightarrow SO_4$$

It is to be noted that the positive copper ions are separated and are free in the solution, such being held there and locked in solution by negative oxygen. Similarly, a solution of any other soluble sulphate or chloride will give the same reaction, regardless of the particular cation present in the solution. Thus, it appears clear that the metal ions in electroplating solutions are positive in nature. In a zinc solution, as another example, metal passes into solution as positive ions upon electrolysis as represented by the equation $$Zn^{++} + 2H^+ \rightarrow ZN^{++} + H_2^{30}$$

The production of positive metal ions appears to be accomplished upon the metal salts being dissolved in acid or cyanide in water in other metals also, such as chromium, silver, nickel, and the like.

In connection with the above, it is a known fact that ozone or $O_3$ is negative in its makeup. The ozone being negative will thus combine with the negative dissolved oxygen to increase the magnetic field and attract the positive metal ions in the rinse water of an electroplating process solution to form the molecules, and as stated above it has been found that the molecules formed in such combination namely, in a combination of the metal ions and the negative ozone ions, are of an enlarged coagulant size such that they can be filtered out. Without the ozone treatment, there is no inexpensive or at least economically feasible filter or process that can pick up these impurities.

As stated, the filter used with the invention may simply comprise the usual sand filters. A filter of 5 to 7 micron size will effectively filter out the molecules in the used electrolytic solution which has been treated with ozone.

As one example of the process, a bath of 800 gallons rinse solution at room temperature was treated with 20 grams of ozone by interjecting ozone treated air into the rinse water. Such treatment was continuous and the filtering likewise was continuous with a 5 micron size filter, it being found that the treatment according to the invention maintained the rinse solution in a condition such that it could be reused continuously. The filtered out molecules can be reclaimed for further use of metal existing therein.

The drawings hereof show structure by means of which the process is carried out.

FIG. 3 is a diagrammatic view of modified apparatus included in the invention;

FIG. 4 is an enlarged detail longitudinal sectional view of another embodiment of mixing nozzle;

Figure 1:
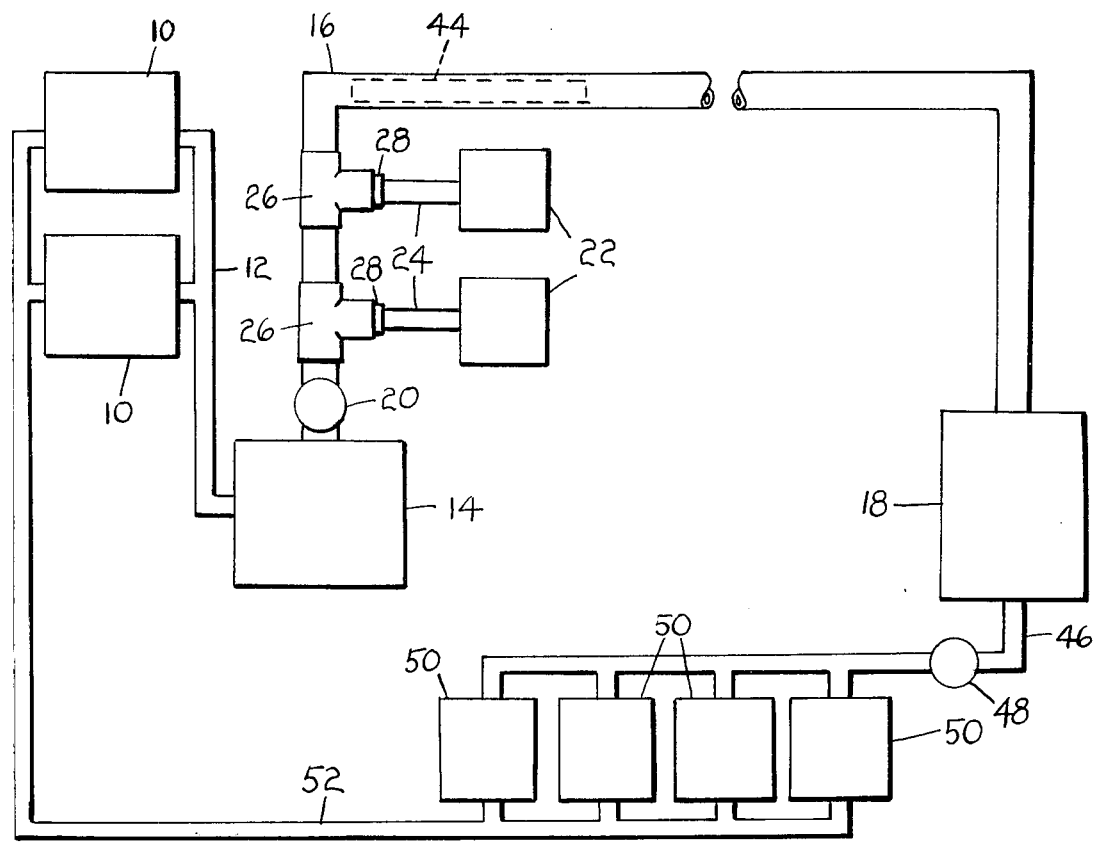
FIG. 1 is a diagrammatic view of electroplating apparatus in combination with the present invention.
Figure 2:
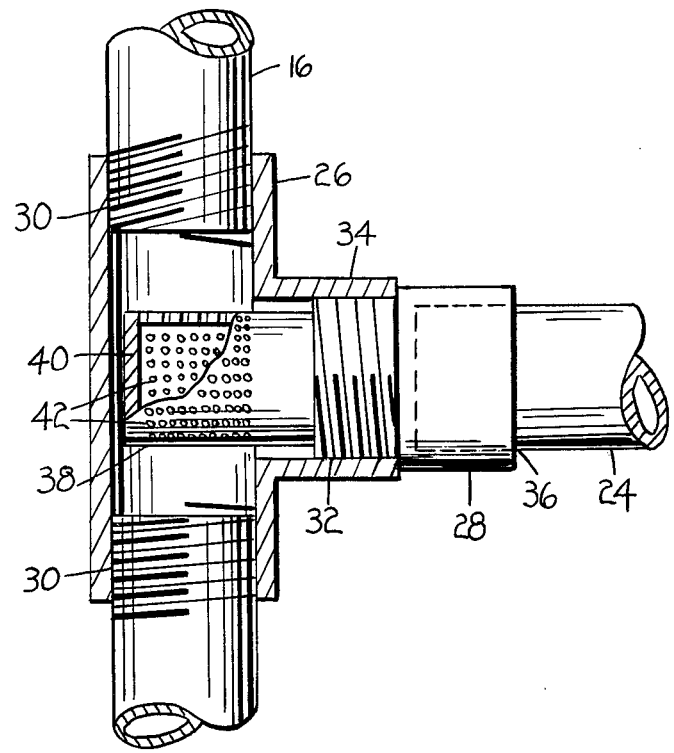
FIG. 2 is an enlarged detail longitudinal sectional view of a mixing nozzle assembly for mixing ozone with the electroplating rinse solution.

With particular reference first to FIGS. 1 and 2 of the drawings, an electroplating process is shown wherein the numerals 10 designate rinse tanks which receive rinse solutions from one or more plating tanks of conventional construction, not shown, wherein upon supplying electric current to opposite terminals, metal in solution is deposited on the surface of the articles. After the articles have been treated they are dipped in the rinse tanks 10.

According to the present invention, a conduit 12 extending from these tanks to a receiving tank 14. Leading from this latter tank is a conduit 16 discharging into a gathering tank 18. Conduit 16 contains a pump 20 therein for providing flow from tank 14 to tank 18.

One or more ozone generators 22 have outlet communication with the conduit 16 by means of conduits 24 and tee connections 26. Ozone is drawn into the conduit 16 through nozzle members 28 disposed in the tee fittings 26 shown in detail in FIG. 2. Each tee fitting 26 has screw threaded connections 30 between sections of the conduit 16, and the nozzle member 28 thereof has a screw threaded connection 32 with a lateral 34 of the tee. The nozzle member 28 has an outwardly opening socket 36 for receiving the conduit 24 and also has an elongated hollow shank portion 38 which upon threaded mounting of the nozzle member in the lateral 34 projects into the main passageway of the tee. The shank portion 38 of the nozzle member is closed at its inner end by a wall 40 and has a plurality of apertures 42 in its side walls.

Thorough mixing of the rinse solution with ozone takes place in the area of shank portion 38 and also in downstream portions of the conduit 16. In fact, it has been found that a detention time is preferable, and for this purpose the treated solution is passed through an elongated conduit, such as, for example, a conduit up to 150 feet in length or even longer. Such elongation of the conduit provides an adequate detention time. It has been found that a good detention time is about sixteen minutes. Also, it is preferred that the conduit 16 include a static mixer 44 of well known construction therein to further effect efficient admixture of the ozone with the solution.

Leading from the gathering tank 18 is a conduit 46 in which a pump 48 is incorporated. Conduit 46 leads to an assembly of filters 50 connected in parallel and having an outlet conduit 52 leading back to the rinse tanks 10. Filters 50 are preferably of about 5 to 7 micron size to accomplish good filtering of the metal precipitates.

In the operation of the present system, the pumps 20 and 48 operate continually to circulate the rinse solution from tanks 10 through tank 14, mixing nozzles 28, gathering tank 18, and filters 50. The ozone being mixed with the rinse solution combines with the positive ions to form a coagulant of a size which can be caught in filters 50. In a preferred arrangement, the apertures 42 are quite small in size and are great in number so that there is a good diffusion of the ozone in the solution.

As an example of the process wherein in filtering a rinse solution of an electroplating process which was not treated with ozone through a filter of about 5 to 7 micron size, no appreciable amount of metals in solution were picked up in the filter. However, by treating approximately 1666 gallons of the rinse solution for four hours with 20 grams of ozone a spectographic analysis of material backwashed from the filter of about 5 to 7 micron size was as follows:

| Element | Percent of Ash | mg/l in original sample (C. s. 630) |
| --- | --- | --- |
| Iron | 35 | 220 |
| Zinc | 20 | 130 |
| Silica | 15 | 90 |
| Aluminum | 6 | 40 |
| Phosphorus | 3.5 | 22 |
| Calcium | 2.5 | 16 |
| Chromium | 5 | 30 |
| Nickel | 2 | 12 |
| Copper | 1.5 | 9 |
| Magnesium | 1.7 | 10 |
| Cadmium | 0.75 | 5 |
| Potassium | 0.7 | 4 |
| Boron | 0.5 | 3 |
| Tin | 0.25 | 2 |
| Lead | 0.08 | 0.5 |
| Vanadium | 0.03 | 0.2 |
| Titanium | 0.04 | 0.3 |
| Barium | 0.02 | 0.1 |
| Zirconium | 0.02 | 0.1 |
| Manganese | 0.02 | 0.1 |
| Molybdenum | 0.01 | 0.05 |
| Cobalt | 0.01 | 0.05 |
| Strontium | 0.01 | 0.05 |
| Silver | 0.001 | 0.005 |

The left-hand column shows percent of ash and the right-hand column shows mg/l of metal coagulants that were caught in the filter after ozone treatment, the total impurities caught thus being a combination shown in the two columns.

Although the pH values may vary somewhat in different rinse solutions of electroplating processes, the particular pH of such solutions does not materially enter into the effect of operation of the ozone on the solutions.

By means of the above described apparatus for treating rinsing solutions for electroplating processes, such solutions can be used over and over continuously. Also, another advantage of the present system is that the ozone will oxidize the cyanide to cyanate and with continuous oxidation by ozone the cyanate will separate off as harmless gas.

As stated hereinbefore, the present process may also be used to treat sea water for the purpose of removing the positive sodium ion or salt therefrom. That is, using the same theory explained above in connection with the electroplating, the treatment thereof with ozone combines them with the negative ions to form molecules of a size which can be filtered out economically. The treatment of sea water may be accomplished generally by the apparatus described in connection with the electroplating process.

Another embodiment of the apparatus is shown in FIGS. 3–8. This apparatus is not illustrated specifically in connection with an electroplating process but illustrates that the concept can have broader usage such as for distilling water and other purposes which may require purification of water. The inlet 54 shown in this embodiment may thus comprise an intake from any source of water to be treated such as tap water to be distilled, stagnant water to be treated, electroplating solution to be treated, etc. A pump 56 is disposed in the inlet 54 and moves the water through a filter 58 communicating by means of a conduit 60 with a top portion of a treatment tank 62. An outlet conduit 64 extends from a bottom portion of treatment tank 62 to a bottom portion of a storage tank 66. Movement of the water from treatment tank 62 to the storage tank is accomplished by a pump 68 in the conduit 64, and such conduit also has a filter 70 incorporated therein together with control valves 72 and 74 on opposite sides of the filter and a check valve 76 on the upstream side of the filter. Storage tank 66 has an outlet 78 in which is incorporated a pressure regulated valve 80 arranged to operate the pump 68 in a well known manner when a selected quantity of water is drawn off from the storage tank 66, thus maintaining the water in the storage tank at a selected level.

It is desired also that the treatment tank 62 be maintained at a selected level, and for this purpose a pressure operated sensor 82, or other suitable sensor, is in a circuit 84 with a solenoid operated valve 86 controlling flow of water in the conduit 60. Upon emptying of tank 62 to a selected level with relation to the sensor 82, additional water is pumped in through the inlet. A transformer 88 may be employed in the circuit 84 to provide a low voltage system for the sensor 82 in a well known manner. Treatment tank 62 has a vent 89 which preferably leads to an outside area.

Extending between the bottom of treatment tank 62 and the top thereof is a conduit 90 having a pump 92 therein. An ozone generator 94, to be described, has an outlet conduit 96 connected into conduit 90 by means of a tee connection 98, a check valve 100 being disposed in the conduit 96 to provide one way flow of ozone. Tee connection 98, FIG. 4, has a pair of nipples 102 and 104 threadedly connected to it and providing threaded connection in the conduit 90. Nipple 102 has a venturi or throat 106 intermediate its ends as well as a flared inlet 108 at its inner end. Nipple 104 has a nozzle 110 mounted on its inner end, and the tip end of this nozzle projects into the flared inlet end of the nipple 102. By the nozzle arrangement shown in FIG. 4, pressured flow of fluid in the conduit 90 from the bottom of the tank to the top, namely, in the direction of arrows 112 in FIG. 4, ozone is drawn in from the generator in the direction of arrows 114 and intermixed with water being circulated through conduit 90. Thorough mixing of the ozone with the water and suitable intake is accomplished by the venturi action existing in the nipple 106.

Conduit 90 has suitable pressure meters 116 therein together with one or more operating valves 118.

Figure 5:
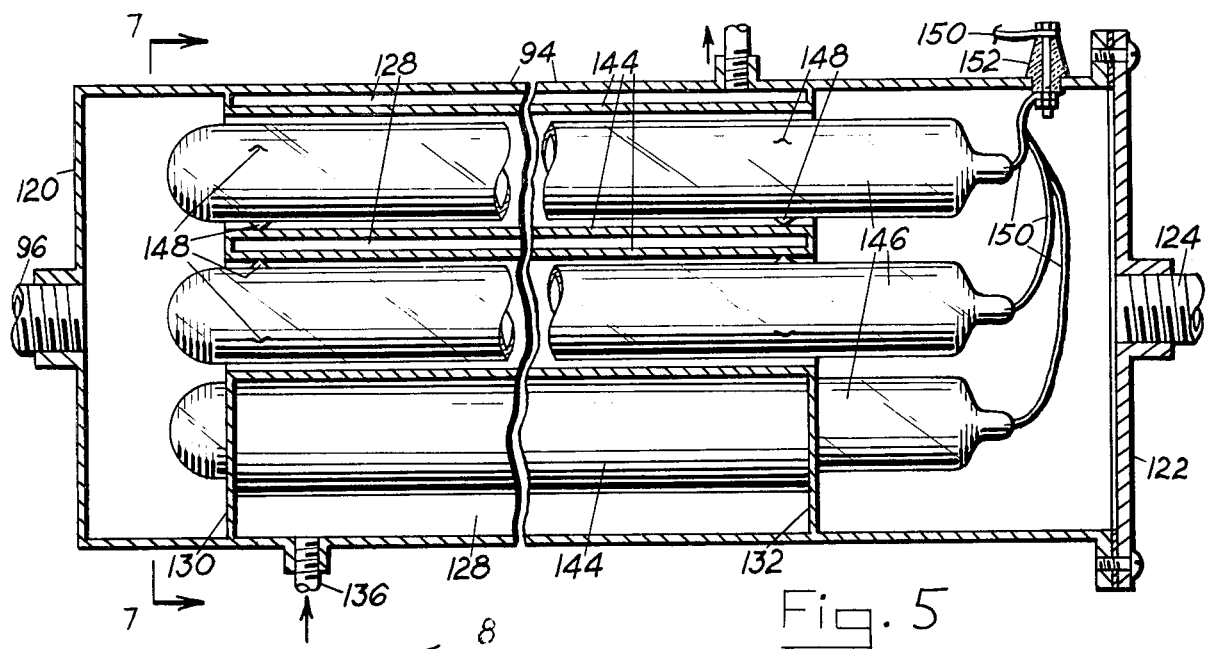
FIG. 5 is an enlarged foreshortened longitudinal sectional view of an ozone generating unit incorporated in the invention.
Figure 6:
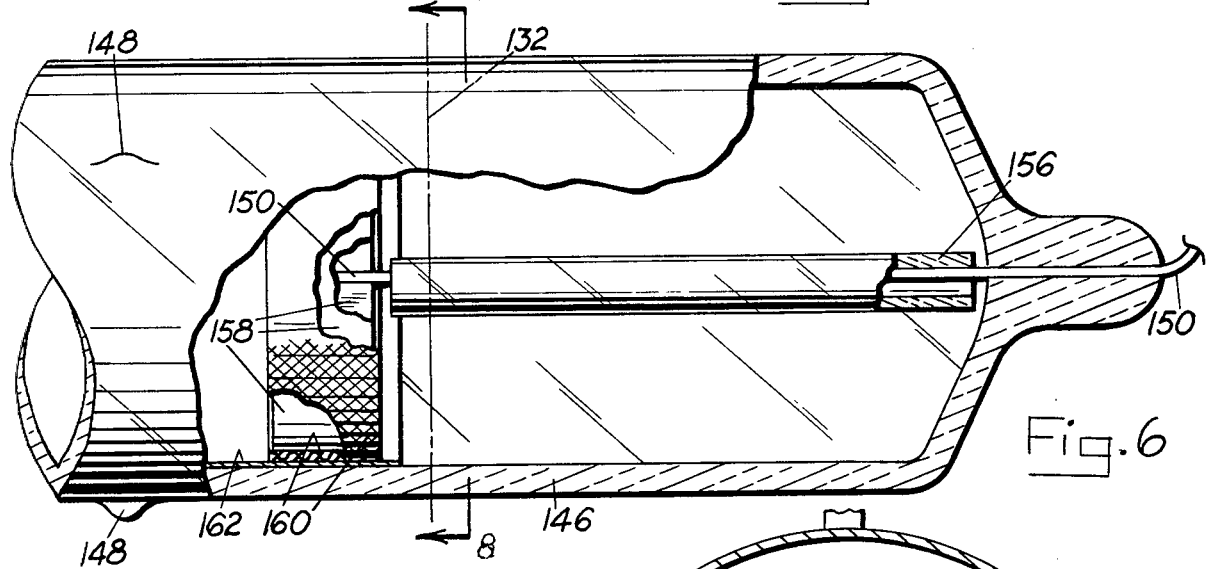
FIG. 6 is an enlarged fragmentary elevational view of an ozone generating tube included in the ozone generating unit.
Figures 7, 8:
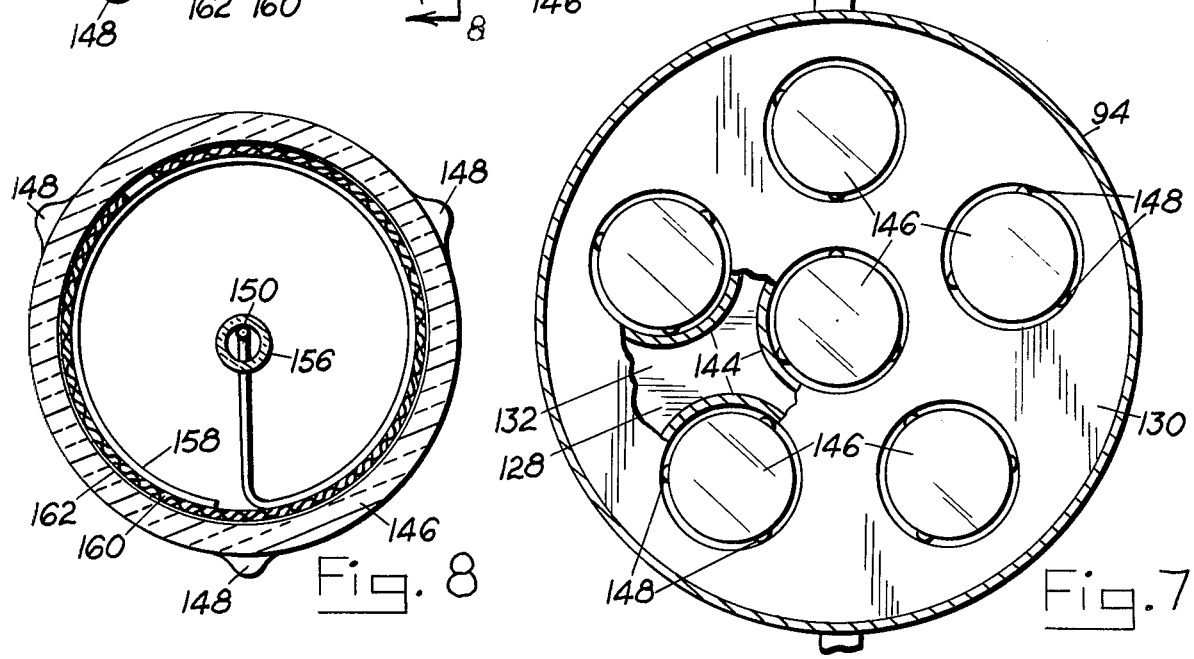
FIG. 7 is an enlarged cross sectional view taken on the line 7—7 of FIG. 5.
FIG. 8 is a cross sectional view taken on the line 8—8 of FIG. 6.

The ozone generator 94, FIGS. 5 and 7, comprises a tubular housing having a rear wall 120 and a removable front wall 122. This housing is substantially air tight to confine generated ozone in its circuit. A conduit 124 leads from the front wall 122 to a filter 126, FIG. 3, of a suitable type which removes moisture from the outside air that is to be drawn into the generator 94. Such a filter may utilize for example silica jel as the filtering medium. The use of such a filter prevents the formation of nitric oxide within the generator.

Formed integrally within the generator is an inner casing 128 forming a water tight area through the medium of the tubular wall of the casing 94 together with a rear wall 130 and a front wall 132. Inner casing 128 comprises a cooling chamber for generating tubes to be described and is filled with a cooling medium such as water or other appropriate summer-winter coolant. The coolant is circulated through a radiator 134, FIG. 3, in a conduit 136 leading from an upper forward portion of the inner casing 128 to a lower rearward portion of such casing. A pump 138 is incorporated in the conduit 136 to provide circulation, and an expansion chamber 140 is provided at the upper connection of the conduit into the casing to prevent air lock. Conduit 136 has one or more suitable control valves 142 therein.

With particular reference to FIGS. 5 and 7, inner casing 128 has a plurality of longitudinally extending tubular open-ended socket portions 144 therein each receiving an ozone generating tube 146. Socket portions 144 are constructed of an electrically conducting material to form the condensing action with the tubes to form the ozone. Tubes 146 are constructed of glass and have outwardly projecting heads 148 on their exterior surface which provide support for the tubes in the socket portions 144 and provide spacing of the outer surface of the tubes 146 with their respective socket portions 144 to provide the necessary encircling condensing space around the tubes. Beads 148 are secured to the outer surface of the tubes and particularly are not formed by indentations from the glass, whereby the inner surface of the glass is uninterrupted for proper condensing action.

With particular reference to FIGS. 5-8, tubes 146 comprise hermetically sealed tubular glass members having an input wire 150 passing through the front end of the tube in sealed relation. Wires 150 are connected to an insulator 152 mounted on the top wall of the generator housing and then extend to a source of high voltage. The housing 94 is grounded at 154, FIG. 1. The input wire 150 for each tube supports a glass tube 156 and is connected at its inner end to a spring band 158 which in expanded form is arranged to clamp firmly against the inner surface of the tube 146. The outer surface of band 158 integrally supports a conductor material 160 such as copper gauze. This gauze is connected electrically to the wire 150. Such electrical connection is accomplished by constructing the band 158 from an electrically conducting material, although if desired it is apparent that the wire end can itself be secured to the copper gauze band 160.

The inner surface of the tubes 146 has an electrically conducting coating 162 such as silver, and this coating extends all the way around the inner periphery of the tube from the rearward end of the latter to a point just forward of the copper band 160. Tubes 146 are filled with nitrogen to prevent oxidization of fittings therein.

The tubes are inserted in the open ended sockets 144 to the extent that the end edge of the silver coating 162 is disposed inwardly of the front wall 132 of the housing. Upon the application of a high voltage to the silver coating, the condensing action which exists between such coating and the metal compartment 128 produces ozone. The front wall 132 is shown in phantom in FIG. 6 to show the inserted position of the tubes. Glass tube 156 has a length to extend rearwardly of the wall 132 in the inserted position of the tube to prevent arcing between any exposed position of the wire 150 and the casing 128.

In the operation of the system of FIGS. 3-8, raw water to be treated is admitted into the treatment tank 62 and is held at a level as determined by the sensor 82. With the pump 92 in operation to continuously circulate the water from the bottom of treatment tank 62 around to the top thereof, and with the ozone generator 94 in operation, outside air is drawn in through filter 126 and ozone produced in the generator 94 and then discharged through the mixing valve 98. As stated hereinbefore, the pressure flow of the water through the nozzle 110 draws the ozone into the mixing valve and produces thorough mixing thereof in the water. Repeated circulation of the water through the treatment tank 62 and around the conduit 90 provides for adequate treatment by ozone to destroy the virus and bacteria in the water and to form the metal coagulants capable of being removed by the filter 70. This filter as well as filter 58 may comprise a sand filter such as a 5-7 micron size sand filter. The resulting solution reaching the storage tank 66 thus comprises water which can be commercially used as distilled water or in other cases where it is desired to merely run off the water such as into a waterway or sewer system such as for the discharge of rinse water in an electroplating process, the water meets the requirements of environmental regulations. The pressure regulator 80 maintains the storage tank at a selected level by operation of the pump 68 as described hereinbefore.

The circulation of the water through conduit 90 is at a selected rate of movement and the input from the ozone generator 94 is sufficient to saturate the water with ozone. In an exemplary arrangement wherein the treatment tank comprised an 85 gallon tank and after initial treatment of the water circulating through conduit 90, 13 gallons could be drawn off every five minutes. Greater output could of course be obtained by enlarging the system.

It is to be understood that the forms of my invention herein shown and described are to be taken as preferred examples of the same and that various changes in the shape, size and arrangement of parts may be resorted to without departing from the spirit of my invention or the scope of the subjoined claims.

Having thus described my invention, I claim:

1. An ozone generating system comprising a housing having a closed interior with a removable end wall, a hollow casing in said housing including means to receive a coolant, the interior of said casing being isolated in sealed relation from the interior of said housing, a forced cooling system associated with said inner casing for circulating a coolant therethrough, at least one open-ended tubular portion extending through said inner casing, said tubular portion being formed of electrically conducting metal, at least one glass ozone generating tube having a diameter smaller than said tubular portion, an electrically conducting silver coating on the interior surface of said tube, a conductor leading into said tube for admitting high voltage into said tube, an electrically conducting band secured to said conductor and engageable with the coating around the interior of said tube, said ozone generating tube being removably supported in said tubular portion by axial movement thereof, spacer means holding said ozone generating tube centered in said tubular portion in circumferentially spaced relation thereto whereby said ozone generating tube upon a high voltage input being applied thereto operates with the metal in said tubular portion to provide ozone, the space between said ozone generating tube and said tubular portion communicating with the interior of said housing, and inlet and outlet means in said housing for receiving inlet air and discharging generated ozone, respectively.

2. The ozone generating system of claim 1 wherein said spacer means comprises glass beads projecting from the outer surface of said tube.

3. The ozone generating system of claim 1 wherein said electrically conducting band comprises a spring band.

4. The ozone generating system of claim 1 comprising a treatment tank, means connecting said tank to a source of liquid to be treated with ozone, first conduit means located outside of said treatment tank extending from a bottom portion of said tank to a top portion thereof, pump means in said conduit for pressured pumping of water in said conduit, and second conduit means connecting the outlet means of said housing with said first conduit means whereby ozone from said housing is drawn into said first conduit means and admixed with the liquid by the pressure flow of water past the point of entry of the ozone into said first conduit means, 5. The ozone generating system of claim 4 including a storage tank, third conduit means extending from said treatment tank to said storage tank, and filter means in said conduit between said treatment tank and said storage tank, said filter means comprising a 5 to 7 micron size filter.

* * * * *